US012645449B2

(12) United States Patent
Okamoto

(10) Patent No.: US 12,645,449 B2
(45) Date of Patent: Jun. 2, 2026

(54) VEHICULAR ELECTRONIC CONTROL DEVICE, VEHICULAR ELECTRONIC CONTROL SYSTEM, AND UPDATED CONFIGURATION INFORMATION DETERMINATION PROGRAM

(71) Applicant: DENSO CORPORATION, Kariya-city (JP)

(72) Inventor: Shoma Okamoto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 277 days.

(21) Appl. No.: 18/505,691

(22) Filed: Nov. 9, 2023

(65) Prior Publication Data

US 2024/0069905 A1 Feb. 29, 2024

Related U.S. Application Data

(63) Continuation of application No. PCT/JP2022/018189, filed on Apr. 19, 2022.

(30) Foreign Application Priority Data

May 14, 2021 (JP) ................................. 2021-082438

(51) Int. Cl.
*G06F 8/65* (2018.01)
*G06F 8/61* (2018.01)
*G06F 9/44* (2018.01)
*G06F 9/45* (2006.01)
(Continued)

(52) U.S. Cl.
CPC ...................................... *G06F 8/65* (2013.01)

(58) Field of Classification Search
CPC ..... G06F 8/65; G06F 8/61; G06F 8/71; G06F 9/52; G06F 8/66; G06F 9/4401; G06F 8/654; B60L 53/66; B60W 50/035; G07C 5/008; H04W 4/48; H04L 69/18; H04L 67/12; H04L 41/082
See application file for complete search history.

(56) References Cited

U.S. PATENT DOCUMENTS

| | | | | |
|---|---|---|---|---|
| 9,600,266 | B2 * | 3/2017 | Molin | ..................... F01N 9/002 |
| 12,524,549 | B2 * | 1/2026 | Yi | ......................... G06F 21/572 |
| 2015/0113521 | A1 | 4/2015 | Suzuki et al. | |

(Continued)

FOREIGN PATENT DOCUMENTS

| | | |
|---|---|---|
| CN | 111614765 A | 9/2020 |
| JP | 2015079468 A | 4/2015 |

(Continued)

*Primary Examiner* — Thuy Dao
(74) *Attorney, Agent, or Firm* — Harness, Dickey & Pierce, P.L.C.

(57) ABSTRACT

A vehicular electronic control device is configured to acquire update data from a wired tool via wired communication, acquire, as first updated configuration information, updated configuration information from the wired tool, update software of an update target node by writing the update data to the update target node, acquire, as second updated configuration information, updated configuration information from a management target node including the update target node, and collate the first updated configuration information with the second updated configuration information to determine consistency of the updated configuration information.

9 Claims, 13 Drawing Sheets

UPDATED CONFIGURATION INFORMATION TRANSFERRED FROM WIRED TOOL TO CGW (TARGET OF LEGAL REQUEST)

| | UPDATED CONFIGURATION INFORMATION OF SOFTWARE | | |
|---|---|---|---|
| RxSWIN | 012345 | | |
| TARGET ID | ECU_A | ECU_B | ECU_C |
| ECU_HW_ID | HW_A1 | HW_B1 | HW_C1 |
| ECU_SW_ID | SW_A2 | SW_B2 | SW_C1 |

(51) Int. Cl.
    *H04L 29/08*        (2006.01)
    *H04W 4/40*        (2018.01)

(56)          References Cited

U.S. PATENT DOCUMENTS

| | | |
|---|---|---|
| 2018/0081671 A1 | 3/2018 | Naruse et al. |
| 2018/0300472 A1* | 10/2018 | Nakamura ........... H04W 12/06 |
| 2019/0236776 A1 | 8/2019 | Miyamoto |
| 2020/0050378 A1 | 2/2020 | Sakurai et al. |
| 2020/0050442 A1 | 2/2020 | Sakurai et al. |
| 2020/0183676 A1 | 6/2020 | Sakurai et al. |
| 2020/0241771 A1 | 7/2020 | Sakurai et al. |
| 2020/0272450 A1* | 8/2020 | Inoue ..................... B60L 53/66 |
| 2021/0155176 A1 | 5/2021 | Harata et al. |
| 2021/0157529 A1 | 5/2021 | Sakurai et al. |
| 2021/0157566 A1 | 5/2021 | Sakurai et al. |
| 2021/0157567 A1 | 5/2021 | Sakurai et al. |
| 2021/0157568 A1 | 5/2021 | Sakurai et al. |
| 2021/0157571 A1 | 5/2021 | Ogawa et al. |
| 2021/0157572 A1 | 5/2021 | Harata et al. |
| 2021/0157575 A1 | 5/2021 | Ogawa et al. |
| 2021/0157902 A1 | 5/2021 | Sakurai et al. |
| 2022/0012043 A1 | 1/2022 | Sakurai et al. |

FOREIGN PATENT DOCUMENTS

| | | |
|---|---|---|
| JP | 2016188017 A | 11/2016 |
| JP | 2019129951 A | 8/2019 |
| JP | 2020027623 A | 2/2020 |

* cited by examiner

FIG. 5

UPDATED CONFIGURATION INFORMATION TRANSFERRED FROM WIRED TOOL TO CGW
(TARGET OF LEGAL REQUEST)

| | | UPDATED CONFIGURATION INFORMATION OF SOFTWARE | | |
|---|---|---|---|---|
| RxSWIN | | | 012345 | |
| TARGET ID | | ECU_A | ECU_B | ECU_C |
| ECU_HW_ID | | HW_A1 | HW_B1 | HW_C1 |
| ECU_SW_ID | | SW_A2 | SW_B2 | SW_C1 |

FIG. 6

UPDATED CONFIGURATION INFORMATION TRANSFERRED FROM WIRED TOOL TO CGW
(EXEMPT FROM TARGET OF LEGAL REQUEST)

| | UPDATED CONFIGURATION INFORMATION OF SOFTWARE | | |
|---|---|---|---|
| RxSWIN | | — | |
| TARGET ID | ECU_A | ECU_B | ECU_C |
| ECU_HW_ID | HW_A1 | HW_B1 | HW_C1 |
| ECU_SW_ID | SW_A2 | SW_B2 | SW_C1 |

FIG. 7

CONFIGURATION INFORMATION TRANSFERRED FROM MANAGEMENT TARGET ECU TO CGW

| TARGET ID | NOT-UPDATED CONFIGURATION INFORMATION OF SOFTWARE | | | UPDATED CONFIGURATION INFORMATION OF SOFTWARE | | |
|---|---|---|---|---|---|---|
| | ECU_A | ECU_B | ECU_C | ECU_A | ECU_B | ECU_C |
| ECU_HW_ID | HW_A1 | HW_B1 | HW_C1 | HW_A1 | HW_B1 | HW_C1 |
| ECU_SW_ID | SW_A1 | SW_B1 | SW_C1 | SW_A2 | SW_B2 | SW_C1 |

UPDATED ↑      UPDATED ↑

VEHICULAR ELECTRONIC CONTROL DEVICE, VEHICULAR ELECTRONIC CONTROL SYSTEM, AND UPDATED CONFIGURATION INFORMATION DETERMINATION PROGRAM

CROSS-REFERENCE TO RELATED APPLICATIONS

The present application is a continuation application of International Patent Application No. PCT/JP2022/018189 filed on Apr. 19, 2022 which designated the U. S. and claims the benefit of priority from Japanese Patent Application No. 2021-082438 filed on May 14, 2021. The entire disclosures of all of the above applications are incorporated herein by reference.

TECHNICAL FIELD

The present disclosure relates to a vehicular electronic control device, a vehicular electronic control system, and an updated configuration information determination program.

BACKGROUND

A technology has been proposed in which a vehicular electronic control device functioning as a gateway ECU is provided on a vehicle side, and in the vehicular electronic control device, update data downloaded from a center device is delivered to an update target node, and software of the update target node is updated by over-the-air (OTA).

SUMMARY

According to one aspect of the present disclosure, a vehicular electronic control device is configured to acquire update data from a wired tool via wired communication, acquire, as first updated configuration information, updated configuration information from the wired tool, update software of an update target node by writing the update data to the update target node, acquire, as second updated configuration information, updated configuration information from a management target node including the update target node, and collate the first updated configuration information with the second updated configuration information to determine consistency of the updated configuration information.

BRIEF DESCRIPTION OF DRAWINGS

The above and other objects, features and advantages of the present disclosure will become more apparent from the following detailed description made with reference to the accompanying drawings. In the drawings:

FIG. 5 is a diagram illustrating updated configuration information transferred from a wired tool to a CGW;

FIG. 6 is a diagram illustrating updated configuration information transferred from a wired tool to a CGW;

FIG. 7 is a diagram illustrating configuration information transferred from a management target ECU to a CGW;

DETAILED DESCRIPTION

Figure 1:
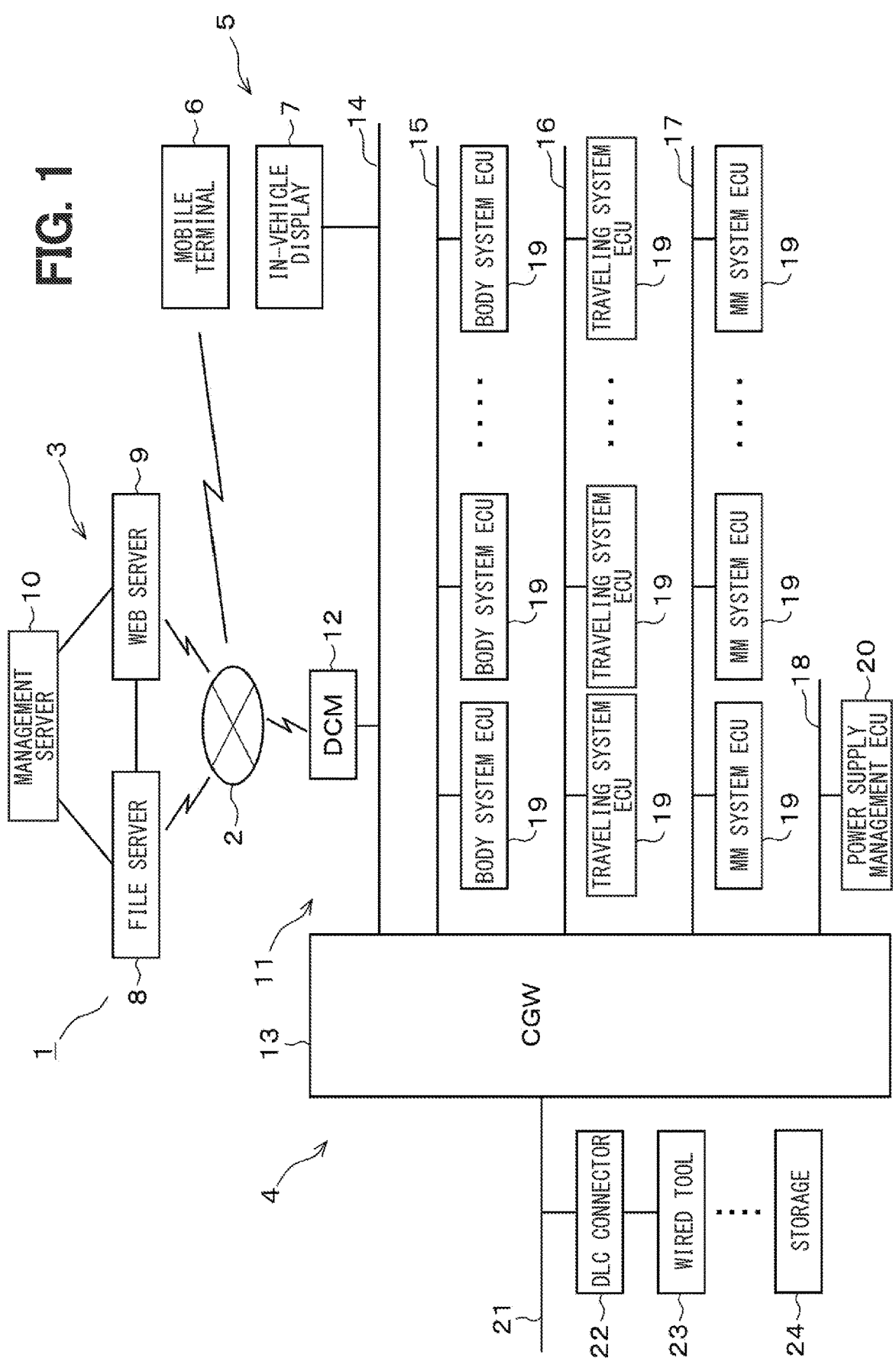
FIG. 1 is a diagram illustrating an overall configuration of an embodiment.

In recent years, with diversification of vehicle control such as a driving-assistance function and an automated driving function, a scale of software including programs and data for vehicle control, diagnosis, and the like installed in a node such as an electronic control device (hereinafter, referred to as an electronic control unit (ECU)) of a vehicle is increasing. Furthermore, with version up by function improvement or the like, there is an increasing opportunity to update (reprogramming) the software necessary for the operation of the node. On the other hand, with the development of communication networks, a connected car technology has also become widespread. Under such circumstances, a technology has been proposed in which a vehicular electronic control device functioning as a gateway ECU is provided on a vehicle side, and in the vehicular electronic control device, update data downloaded from a center device is delivered to an update target node, and software of the update target node is updated by over the air (OTA).

When the software of the update target node is updated, the configuration information including the version of hardware of the node, the version of the software, and the like is updated. Therefore, in order to determine whether the software of the update target node is normally updated, it is necessary to verify whether updated configuration information that is configuration information after updating is proper. For example, a relate art discloses a configuration in which a vehicular electronic control device acquires updated configuration information from a management target node including an update target node and transmits the updated configuration information to a center device, and the center device collates the updated configuration information stored in advance with the updated configuration information received from the vehicular electronic control device to verify whether the updated configuration information is proper.

The configuration in which the center device verifies whether the above-described updated configuration information is proper is on the premise that a contract of an OTA service is made and then the vehicular electronic control device can establish communication connection with the center device. On the other hand, before the contract of the OTA service is made, the vehicular electronic control device cannot establish communication connection with the center device, and thus it is not possible to verify whether the updated configuration information is proper in the center device. Therefore, for example, in a case where the software of the node is updated using a wired tool before the contract of the OTA service is made in a backyard or the like, it is not possible to verify whether the updated configuration information is proper.

The present disclosure describes a vehicular electronic control device, vehicular electronic control system, and updated configuration information determination program, or the like which appropriately verify whether the updated configuration information is proper even when the contract of the OTA service is not made and the communication connection with the center device cannot be established.

According to one aspect of the present disclosure, an update data acquisition unit acquires update data from a wired tool operable by an operator via wired communication. A first updated configuration information acquisition unit acquires, as first updated configuration information, updated configuration information from the wired tool by the wired communication. A software update unit updates software of an update target node by writing the update data to the update target node. A second updated configuration information acquisition unit acquires, as second updated configuration information, updated configuration information from a management target node including the update target node. A first consistency determination unit collates the first updated configuration information with the second updated configuration information to determine consistency of the updated configuration information.

The consistency is determined by collating a first updated configuration information acquired from the wired tool with a second updated configuration information acquired from the management target node including the update target node after updating of the software of the update target node. It is possible to appropriately verify whether the updated configuration information is proper even when the contract of the OTA service is not made and the communication connection with the center device cannot be established.

Hereinafter, an embodiment will be described with reference to the drawings. The vehicular electronic control system is a system in which software for vehicle control, diagnosis, and the like installed in an electronic control device (hereinafter, referred to as an electronic control unit (ECU)) can be updated by over the air (OTA). The software includes programs and data for implementing functions such as vehicle control and diagnosis, and can also be expressed as an application. In the present embodiment, a case where software for vehicle control or diagnosis is updated will be described, but for example, the present invention can also be applied to a case where a map application, or map data used in the map application is updated.

As illustrated in FIG. 1, a vehicular electronic control system 1 includes a center device 3 on a communication network 2 side, a vehicle-side system 4 on the vehicle side, and a display terminal 5. The communication network 2 includes, for example, a mobile communication network with a 4G line, the Internet, and Wireless Fidelity (WiFi) (registered trademark).

The display terminal 5 is a terminal having a function of receiving an operation input from the user and a function of displaying various screens, and is, for example, a mobile terminal 6 such as a smartphone or a tablet that can be carried by the user, and an in-vehicle display 7 disposed inside the vehicle. The mobile terminal 6 can perform data communication with the center device 3 via the communication network 2 as long as the mobile terminal 6 is within a communication range of the mobile communication network. The in-vehicle display 7 may be connected to the vehicle-side system 4 and also have a navigation function. The in-vehicle display 7 may be an in-vehicle display ECU having an ECU function, or may have a function of controlling display on a center display, a meter display, or the like.

When the user is outside the vehicle and within the communication range of the mobile communication network, the user can perform an operation input while checking various screens involved in the update of the software with the mobile terminal 6 and perform a procedure involved in the update of the software. Inside the vehicle, the user performs an operation input while checking various screens involved in the update of the software with the in-vehicle display 7, and can perform a procedure involved in the update of the software. That is, the user can selectively use the mobile terminal 6 and the in-vehicle display 7 outside and inside the vehicle to perform a procedure involved in updating the software.

The center device 3 controls an update function of software on the communication network 2 side in the vehicular electronic control system 1, and functions as an OTA center that provides an OTA service. The center device 3 includes a file server 8, a web server 9, and a management server 10, and the servers 8 to 10 are configured to be capable of performing data communication with each other. That is, the center device 3 includes a plurality of servers having different functions.

The file server 8 is a server that manages files of software delivered from the center device 3 to the vehicle-side system 4. The file server 8 manages update data provided from a supplier or the like which is a provider of software delivered from the center device 3 to the vehicle-side system 4, specification data provided from an original equipment manufacturer (OEM), a vehicle state acquired from the vehicle-side system 4, and the like. The file server 8 can perform data communication with the vehicle-side system 4 via the communication network 2, and transmits download data including package data in which update data and specification data are packaged in one file to the vehicle-side system 4 when receiving a download request of the package data from the vehicle-side system 4. The download data includes a compressed zip file. The file server 8 may transmit the specification data to the vehicle-side system 4 first without simultaneously transmitting the update data and the specification data to the vehicle-side system 4, and then transmit the download data including the package data in which the update data is packaged in one file to the vehicle-side system 4.

The web server 9 is a server that manages web information. The web server 9 transmits web data managed by the web server 9 in response to a request from a web browser of the mobile terminal 6 or the like. The management server 10 is a server that manages personal information of a user registered in a software update service, an update history of software for each vehicle, and the like.

The vehicle-side system 4 includes a vehicle master device 11. The vehicle master device 11 controls an update function of software on the vehicle side in the vehicular electronic control system 1 and functions as an OTA master. The vehicle master device 11 includes a data communication module (DCM) 12 and a central gate way (CGW) 13. The DCM 12 performs data communication with the center device 3 via the communication network 2.

The CGW 13 functions as a gateway ECU and corresponds to the vehicular electronic control device. The DCM 12 and the CGW 13 are connected so as to perform data communication via a first bus 14. Although FIG. 1 illustrates a configuration in which the DCM 12 and the in-vehicle display 7 are connected to the same first bus 14, the DCM 12 and the in-vehicle display 7 may be connected to separate buses. The CGW 13 may have some or all of the functions of the DCM 12, or the DCM 12 may have some or all of the functions of the CGW 13. That is, in the vehicle master device 11, the function of the DCM 12 and the function of the CGW 13 may be shared in any manner. The vehicle master device 11 may include two ECUs of the DCM 12 and the CGW 13, or may include one integrated ECU having the function of the DCM 12 and the function of the CGW 13.

In addition to the first bus 14, a second bus 15, a third bus 16, a fourth bus 17, and a fifth bus 18 are connected to the CGW 13 as buses on the inside of the vehicle. Various ECUs 19 are connected to the CGW 13 via the buses 15 to 17, and a power supply management ECU 20 is connected to the CGW 13 via a bus 18. Each of the ECUs 19 corresponds to a node.

The second bus 15 is, for example, a bus of a body system network. The ECU 19 connected to the second bus 15 is an ECU that controls the body system. Examples of the ECU that controls the body system include a door ECU that controls locking/unlocking of a door, a meter ECU that controls display on a meter display, an air conditioner ECU that controls driving of an air conditioner, a window ECU that controls opening and closing of a window, and a security ECU that operates to prevent theft of a vehicle.

The third bus 16 is, for example, a bus of a traveling system network. The ECU 19 connected to the third bus 16 is an ECU that controls the traveling system. Examples of the ECU that controls the traveling system include, for example, an engine ECU that controls driving of an engine, a brake ECU that controls driving of a brake, an electronic controlled transmission (ECT) ECU that controls driving of an automatic transmission, and a power steering ECU that controls driving of a power steering.

The fourth bus 17 is, for example, a bus of a multimedia system network. The ECU 19 connected to the fourth bus 17 is an ECU that controls the multimedia system. Examples of the ECU that controls the multimedia system include, for example, a navigation ECU that controls a navigation system, and an ETC ECU that controls an electronic toll collection system (ETC) (registered trademark). Each of the buses 15 to 17 may be a bus of a system other than the bus of the body system network, the bus of the traveling system network, and the bus of the multimedia system network. The number of buses and the number of ECUs 19 are not limited to the illustrated configuration.

The power supply management ECU 20 is an ECU that manages power supply supplied to the DCM 12, the CGW 13, the various ECUs 19, and the like.

A sixth bus 21 is connected to the CGW 13 as a bus outside the vehicle. A data link coupler (DLC) connector 22 to which a wired tool 23 is detachably connected is connected to the sixth bus 21. The wired tool 23 can attach and detach a storage 24, and can read information stored in the storage 24 in a state in which the storage 24 is connected. The storage 24 is, for example, a flash memory storage device such as a universal serial bus (USB) memory, a memory card, or a solid state drive (SSD).

The buses 14 to 18 on the inside of the vehicle and the bus 21 on the outside of the vehicle are configured by, for example, a controller area network (CAN) (registered trademark) bus, and the CGW 13 performs data communication among the DCM 12, the ECU 19, and the wired tool 23 in accordance with a CAN data communication standard or a diagnostic communication standard (unified diagnosis services (UDS): ISO 14229). The DCM 12 and the CGW 13 may be connected by Ethernet, or the DLC connector 22 and the CGW 13 may be connected by Ethernet.

In a case where the software is wirelessly updated, when download data is downloaded from the file server 8, the DCM 12 transmits the downloaded download data to the CGW 13. When receiving the download data from the DCM 12, the CGW 13 decompresses the received download data to acquire package data, and acquires update data and specification data from the acquired package data. In a case where a condition under which installation of writing update data can be instructed is satisfied, the CGW 13 transmits the update data to an update target ECU 19 that is a software update target, and instructs the update target ECU 19 to install the acquired update data. The condition under which the installation can be instructed includes that the acceptance of the installation is obtained, that the vehicle state is an installable state, that the update target ECU 19 is in an installable state, and that the reprogramming data is normal data. When installation of the update data is instructed from the CGW 13, the update target ECU 19 executes the installation of the update data in a case where a condition under which the installation can be executed is satisfied.

When the installation of the update data is completed in the update target ECU 19, the CGW 13 instructs the update target ECU 19 to perform activation in a case where a condition under which activation to activate software after the update completion can be instructed is satisfied. The condition under which the activation can be instructed includes that the acceptance of the activation is obtained, that the vehicle state is an activatable state, and that the update target ECU 19 is in an activatable state. When the activation is instructed from the CGW 13, the update target ECU 19 executes the activation in a case where a condition under which the activation can be executed is satisfied.

On the other hand, in a case where the software is updated by wire, when the wired tool 23 is connected to the DLC connector 22, the wired tool 23 transfers the update data to the CGW 13. When the update data is transferred from the wired tool 23, the CGW 13 transmits the update data to the update target ECU 19, and instructs the update target ECU 19 to install the acquired update data in a case where a condition under which installation of writing the update data can be instructed is satisfied. When installation of the update data is instructed from the CGW 13, the update target ECU 19 executes the installation of the update data in a case where a condition under which the installation can be executed is satisfied.

When the installation of the update data is completed in the update target ECU 19, the CGW 13 instructs the update target ECU 19 to perform activation in a case where a condition under which activation to activate software after the update completion can be instructed is satisfied. When the activation is instructed from the CGW 13, the update target ECU 19 executes the activation in a case where a condition under which the activation can be executed is satisfied.

Figure 2:
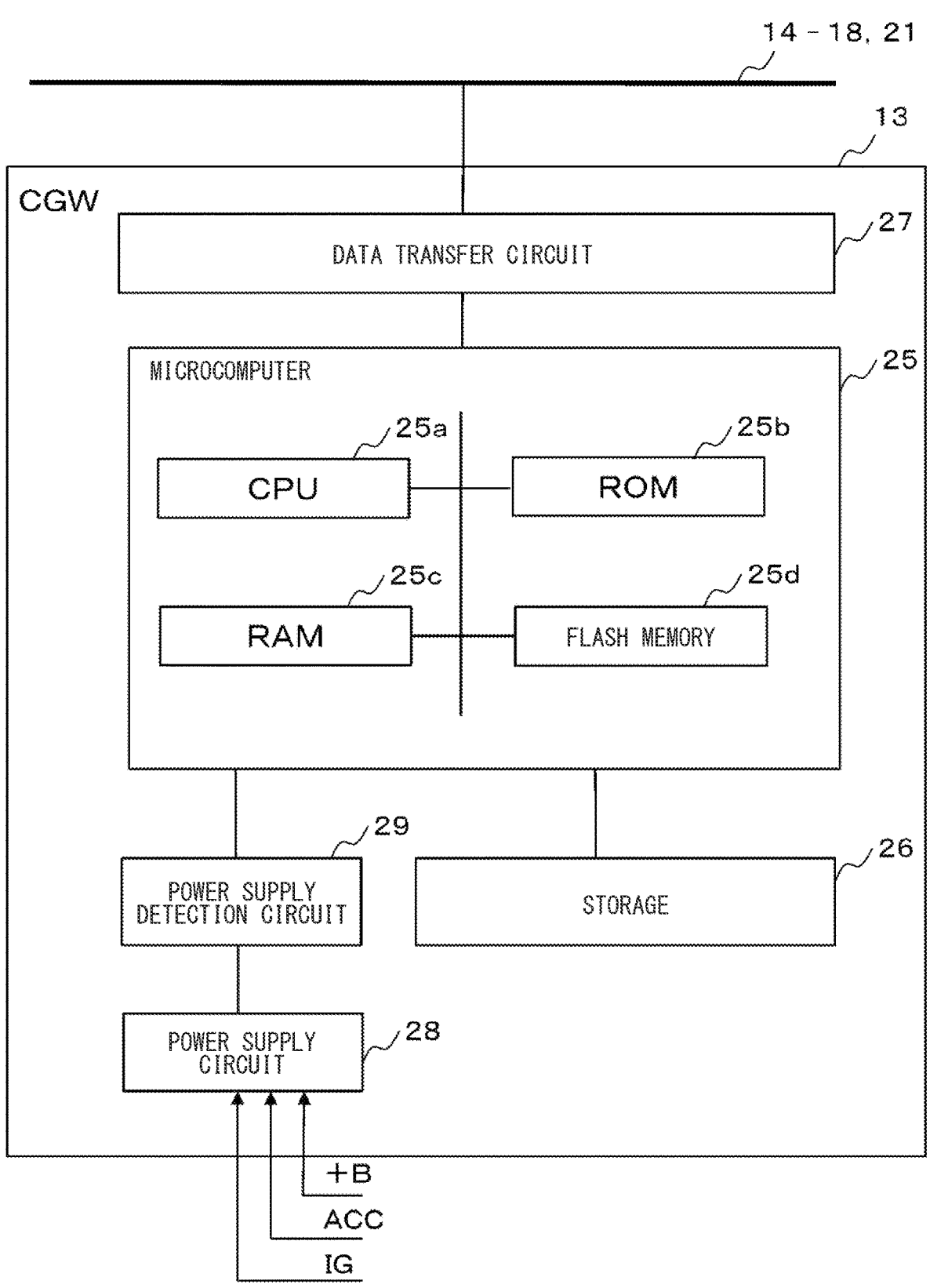
FIG. 2 is a diagram illustrating an electrical configuration of a CGW.

As illustrated in FIG. 2, the CGW 13 includes, as electrical functional blocks, a microcomputer 25, a storage 26, a data transfer circuit 27, a power supply circuit 28, and a power supply detection circuit 29. The microcomputer 25 includes a central processing unit (CPU) 25a, a read only memory (ROM) 25b, a random access memory (RAM) 25c, and a flash memory 25d. The flash memory 25d includes a secure area in which information cannot be read from the outside of the CGW 13. The microcomputer 25 executes various control programs stored in a non-transitory tangible storage medium to perform various processing, and controls the operation of the CGW 13. In the present embodiment, the configuration in which one microcomputer 25 is installed in the CGW 13 is exemplified, but the number, specification, and combination of the microcomputers installed in the CGW 13 are determined in accordance with the processing capacity required for the CGW 13. That is, in a case where the CGW 13 is required to have relatively high processing capacity, a microcomputer with a relatively high specification is adopted, or a plurality of the microcomputers are adopted to implement distributed processing or parallel processing.

The storage 26 is, for example, an embedded Multi Media Card (eMMC) or a NorFlash. The data transfer circuit 27 controls data communication conforming to the CAN data communication standard or diagnostic communication standard among the buses 14 to 18 and 21. The power supply circuit 28 receives battery power supply, accessory power supply, and ignition power supply. The power supply detection circuit 29 detects a voltage value of the battery power supply, a voltage value of the accessory power supply, and a voltage value of the ignition power supply, which are input by the power supply circuit 28, compares these detected voltage values with a predetermined voltage threshold, and outputs a comparison result to the microcomputers 25 and 26. The microcomputers 25 and 26 determine whether the battery power supply, the accessory power supply, and the ignition power supply, which are supplied from the outside to the CGW 13, are normal or abnormal based on the comparison result input from the power supply detection circuit 29.

Figure 3:
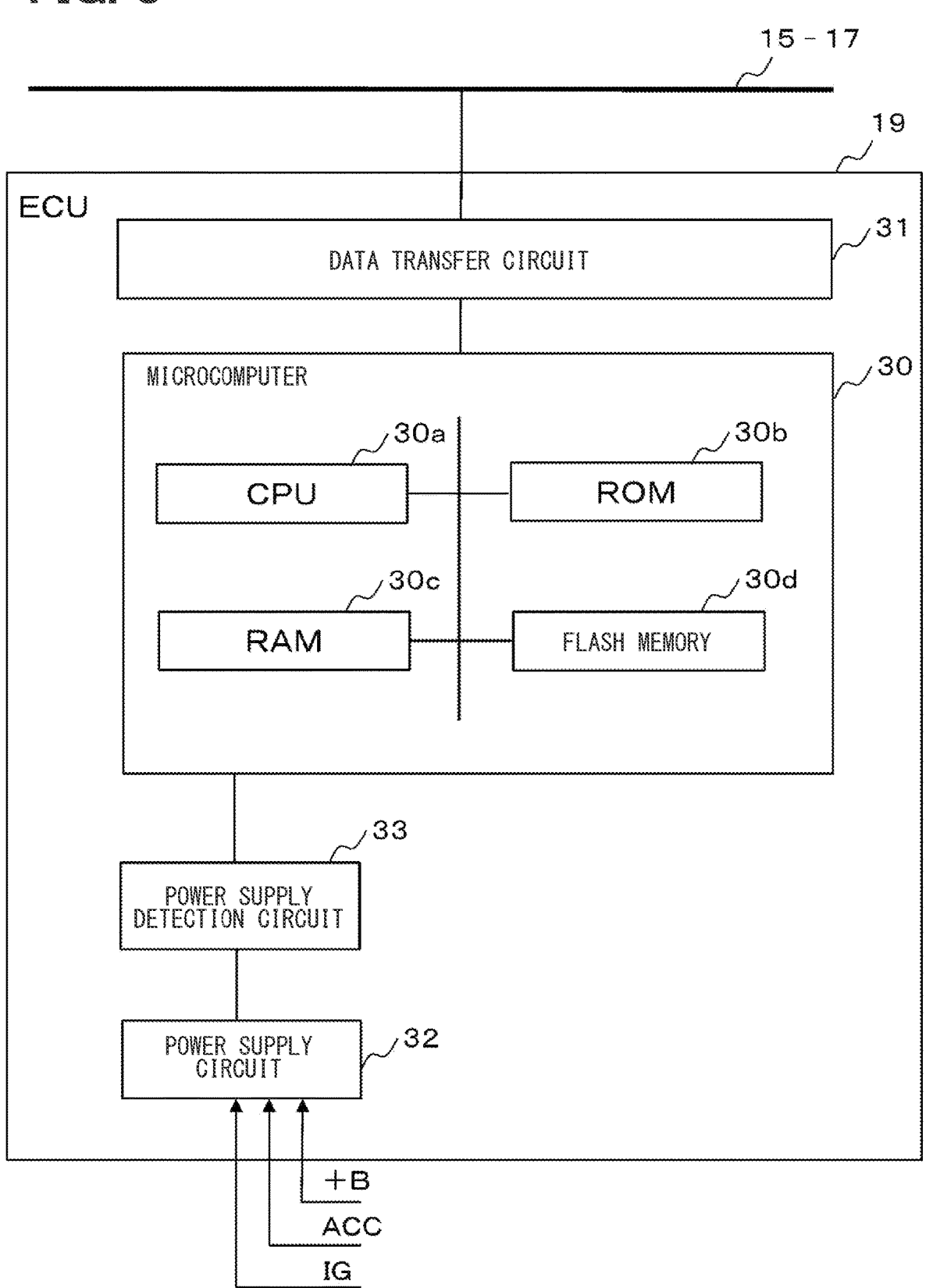
FIG. 3 is a diagram illustrating an electrical configuration of an ECU.

As illustrated in FIG. 3, the ECU 19 includes, as electrical functional blocks, a microcomputer 30, a data transfer circuit 31, a power supply circuit 32, and a power supply detection circuit 33. The microcomputer 30 includes a CPU 30a, a ROM 30b, a RAM 30c, and a flash memory 30d. The flash memory 30d includes a secure area in which information cannot be read from the outside of the ECU 19. The microcomputer 30 executes various control programs stored in a non-transitory tangible storage medium to perform various processing, and controls the operation of the ECU 19.

The data transfer circuit 31 controls data communication conforming to the CAN data communication standard between the buses 15 to 17. The power supply circuit 32 receives battery power supply, accessory power supply, and ignition power supply. The power supply detection circuit 33 detects a voltage value of the battery power supply, a voltage value of the accessory power supply, and a voltage value of the ignition power supply, which are input by the power supply circuit 32, compares these detected voltage values with a predetermined voltage threshold, and outputs the comparison result to the microcomputer 30. The microcomputer 30 determines whether the battery power supply, the accessory power supply, and the ignition power supply, which are supplied from the outside to the ECU 19, are normal or abnormal based on the comparison result input from the power supply detection circuit 27. The ECU 19 has different loads on, for example, a sensor, an actuator, and the like connected thereto, and basically has the same configuration.

In the above-described configuration, in a situation where a contract of an OTA service is made and then the CGW 13 can establish the communication connection with the center device 3, the software can be updated in either the wireless or wired manner. On the other hand, in a situation where the contract of the OTA service is not made, and the CGW 13 cannot establish the communication connection with the center device 3, the software cannot be updated wirelessly, and the software can be updated only by wire.

When the software of the update target ECU 19 is updated, the configuration information including the version of the hardware of the node, the version of the software of the node, and the like is updated. Therefore, in order to determine whether the software of the update target ECU 19 is normally updated, it is necessary to verify whether the updated configuration information is proper. In a case where the update of the software is a target of a legal request, Rx Software Identification Number (RxSWIN) is also updated in addition to the configuration information, and thus, it is necessary to verify whether the updated RxSWIN is also proper. The RxSWIN is an identifier for managing a software version of a related system for each Regulation No. in a rule relating to a structure and device of an automobile (UN rule), and corresponds to system software identification information. The update of the software being the target of the legal request means the update of software including the ECU 19 involved in the traveling control such as the engine ECU in the update target ECU 19. On the other hand, when the update of the software is not the target of the legal request, this means that the update of the software does not include the ECU 19 involved in the travel control in the update target ECU 19, but includes only the ECU 19 not involved in the traveling control such as the navigation ECU in the update target ECU 19.

It is in a situation where after the contract of the OTA service is made, the CGW 13 can establish a communication connection with center device 3, and thus the center device 3 can verify whether the updated configuration information and the updated RxSWIN are proper. However, since it is in a situation where the contract of the OTA service is not made, and the CGW 13 cannot establish a communication connection with the center device 3, the center device 3 cannot verify whether the updated configuration information and the updated RxSWIN are proper in a case where the software is updated by wire. In the present embodiment, by adopting a configuration to be described below, it is possible to verify whether the updated configuration information and the updated RxSWIN are proper even in a case where the software is updated by wire in a situation where the contract of the OTA service is not made and the CGW 13 cannot establish the communication connection with the center device 3.

Figure 4:
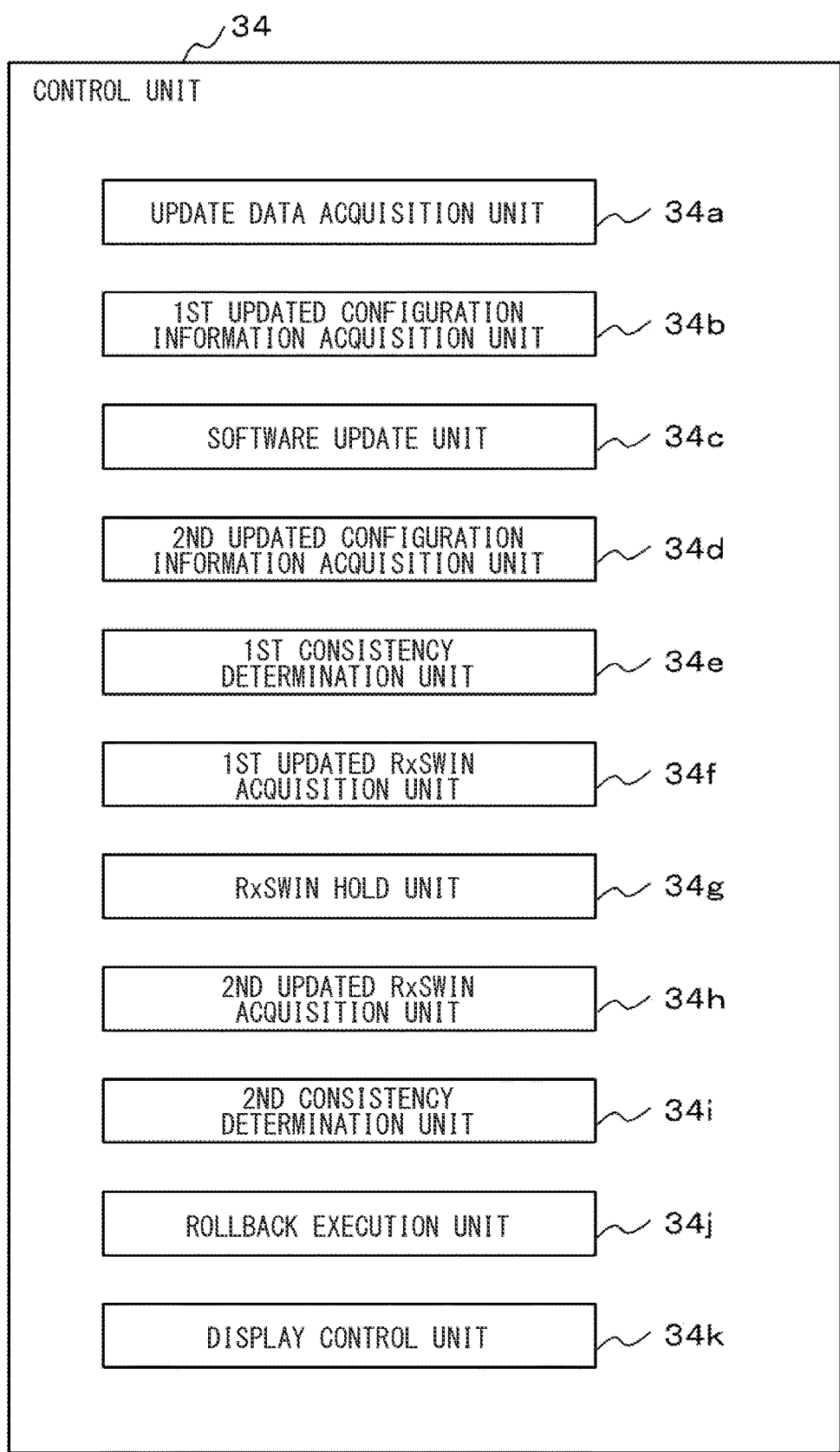
FIG. 4 is a functional block diagram of a CGW.

As illustrated in FIG. 4, in the CGW 13, a control unit 34 controlling operation of the CGW 13 includes an update data acquisition unit 34a, a first updated configuration information acquisition unit 34b, a software update unit 34c, a second updated configuration information acquisition unit 34d, a first consistency determination unit 34e, a first updated RxSWIN acquisition unit 34f, an RxSWIN holding unit 34g, a second updated RxSWIN acquisition unit 34h, a second consistency determination unit 34i, a rollback execution unit 34j, and a display control unit 34k. The first updated RxSWIN acquisition unit 34f corresponds to a first updated system software identification information acquisition unit. The RxSWIN holding unit 34g corresponds to a system software identification information holding unit. The second updated RxSWIN acquisition unit 34h corresponds to a second updated system software identification information acquisition unit. These units 34a to 34k correspond to functions executed by the updated configuration information determination program. That is, the control unit 34 performs the functions of the units 34a to 34k by executing the updated configuration information determination program.

The storage 24 stores update data and updated configuration information. When an operator performs a read operation in a state in which the storage 24 is connected to the wired tool 23, the update data and the updated configuration information are transferred from the storage 24 to the wired tool 23 and stored. Thereafter, when the operator performs a transfer operation in a state in which the wired tool 23 is wire-connected to the CGW 13 via the DLC connector 22, the update data and updated configuration information stored in the wired tool 23 are transferred to and stored in the CGW 13. At this time, the wired tool 23 cannot establish a communication connection with the center device 3. That is, the wired tool 23 transfers the update data and updated configuration information to the CGW 13 in a situation where the communication connection with the center device 3 cannot be established.

The updated configuration information transferred from the storage 24 to the CGW 13 via the wired tool 23 and stored includes components illustrated in FIG. 5 and FIG. 6. The updated configuration information includes RxSWIN, a target ID indicating a management target ECU 19 including an update target ECU 19 and a non-update target ECU 19, an ECU hardware ID (ECU_HW_ID) indicating a hardware version of a management target ECU 19, and an ECU software ID (ECU_SW_ID) indicating a software version of a management target ECU 19. When the update of the software is a target of a legal request, data of the RxSWIN exists as illustrated in FIG. 5. On the other hand, when the update of the software is exempt from the target of a legal request and is not the target of the legal request, there is no data of the RxSWIN as illustrated in FIG. 6.

The update data acquisition unit 34a acquires the update data when the update data is transferred from the wired tool 23 in response to the transfer operation by the operator using the wired tool 23.

When the operator performs the transfer operation using the wired tool 23 and the updated configuration information is transferred from the wired tool 23, the first updated configuration information acquisition unit 34b acquires the transferred updated configuration information as a first updated configuration information.

The software update unit 34c transmits the update data to the update target ECU 19, instructs the update target ECU 19 to install the acquired update data. When the installation of the update data is completed in the update target ECU 19, the software update unit 34c instructs the update target ECU 19 to execute activation, and updates the software.

When the update of the software is completed in the update target ECU 19, the second updated configuration information acquisition unit 34d transmits an information transmission request to the management target ECU 19 that is a management target. The management target ECU 19 includes the update target ECU 19 and the non-update target ECU 19 that is not a software update target and operates in cooperation with the update target ECU 19. That is, the non-update target ECU 19 is the ECU 19 that can be affected by the update of the software of the update target ECU 19. In this case, when receiving the information transmission request from the CGW 13, the update target ECU 19 transmits the updated configuration information to the CGW 13. When receiving the information transmission request from the CGW 13, the non-update target ECU 19 transmits, to the CGW 13, the configuration information that has not been changed before and after the software update of the update target ECU 19 as the updated configuration information.

When the updated configuration information is received from the management target ECU 19, the second updated configuration information acquisition unit 34d acquires the received updated configuration information as the second updated configuration information. The configuration information transferred from the management target ECU 19 to the CGW 13 includes the target ID, the ECU hardware ID, and the ECU software ID, which are described above. After the update of the software, the second updated configuration information acquisition unit 34d acquires the updated configuration information as the second updated configuration information among pieces of the configuration information illustrated in FIG. 7. FIG. 7 illustrates a case where ECU_SW_ID of ECU_A is updated from "SW_A1" to "SW_A2", and ECU_SW_ID of ECU_B is updated from "SW_B1" to "SW_B2".

The first consistency determination unit 34e collates the first updated configuration information with the second updated configuration information to determine whether the first updated configuration information and the second updated configuration information match each other, and determines the consistency of the updated configuration information. In this case, when the update of the software is normally completed, the first updated configuration information matches the second updated configuration information, and when the update of the software is not normally completed, the first updated configuration information does not match the second updated configuration information. When determining that the first updated configuration information matches the second updated configuration information, the first consistency determination unit 34e determines the consistency of the updated configuration information, that is, that the updated configuration information is consistent. On the other hand, when determining that the first updated configuration information does not match the second updated configuration information, the first consistency determination unit 34e determines the non-consistency of the updated configuration information, that is, that the updated configuration information is not consistent.

When the updated configuration information is acquired by the first updated configuration information acquisition unit 34b as the first updated configuration information, the first updated RxSWIN acquisition unit 34f acquires RxSWIN included in the updated configuration information as the first updated RxSWIN. That is, when the update of the software is the target of a legal request, the first updated RxSWIN acquisition unit 34f acquires the first updated RxSWIN since there is data of the RxSWIN. That is, when the update of the software is not the target of a legal request, the first updated RxSWIN acquisition unit 34f doers not acquire the first updated RxSWIN since there is no data of the RxSWIN.

Figure 8:
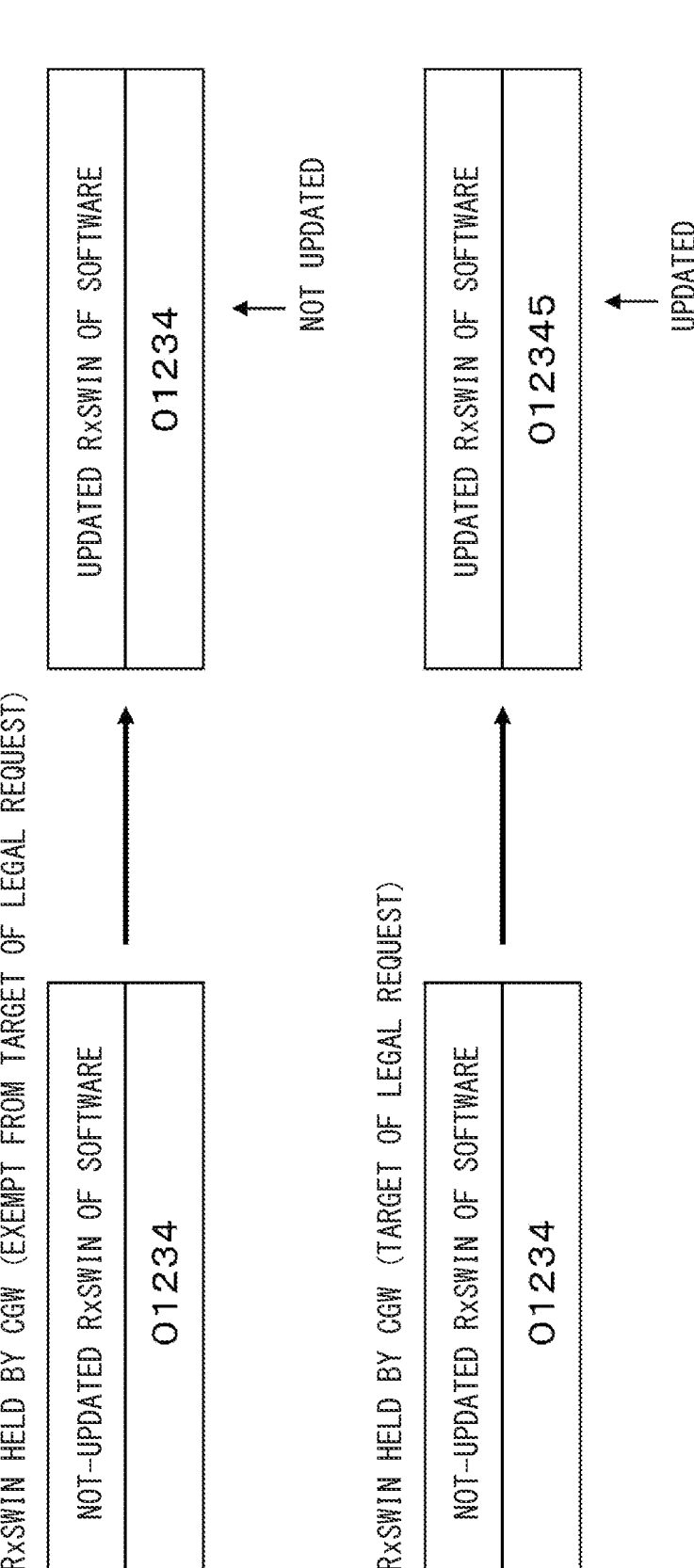
FIG. 8 is a diagram illustrating RxSWIN.
Figure 9:
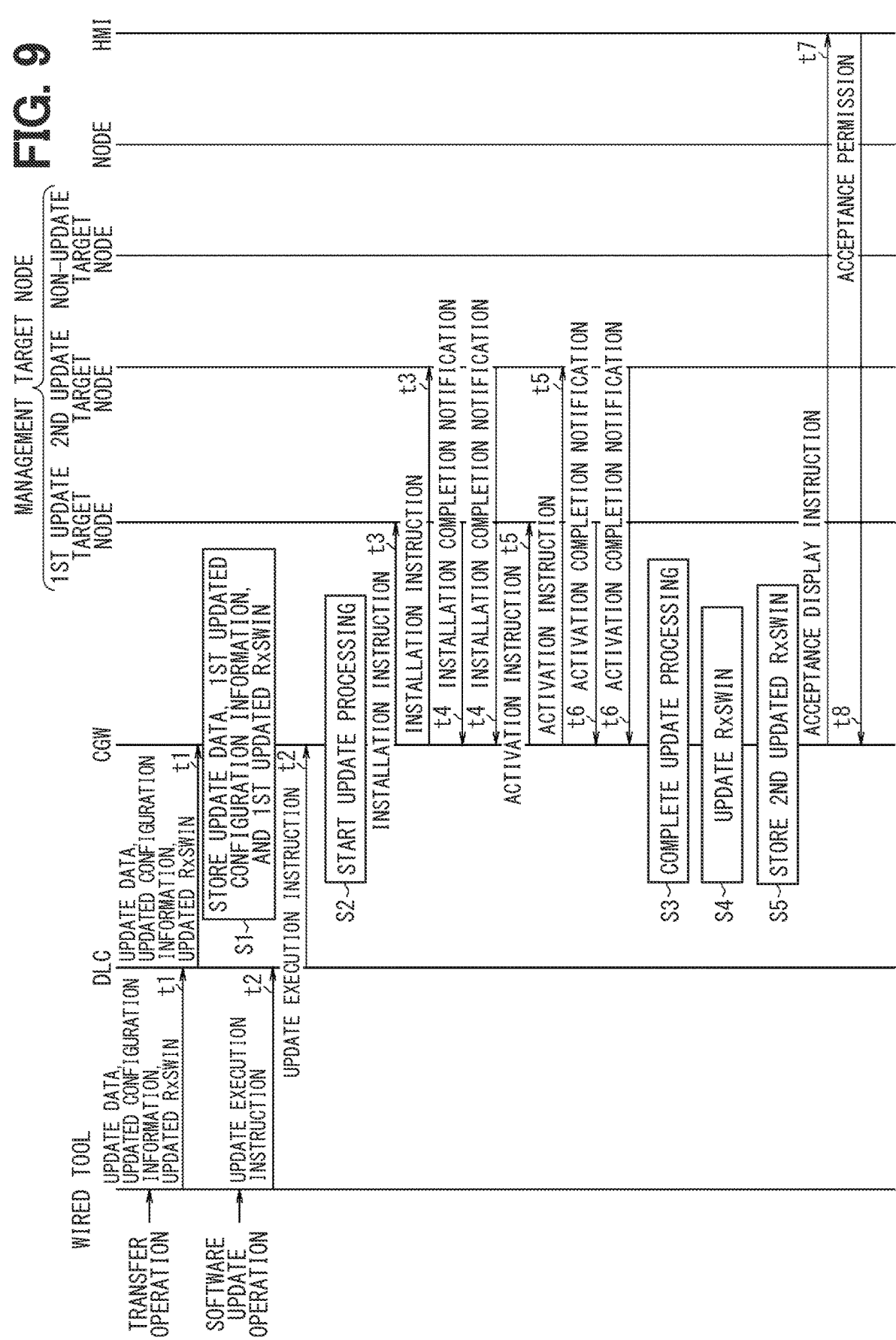
FIG. 9 is a diagram illustrating a flow of processing.
Figure 10:
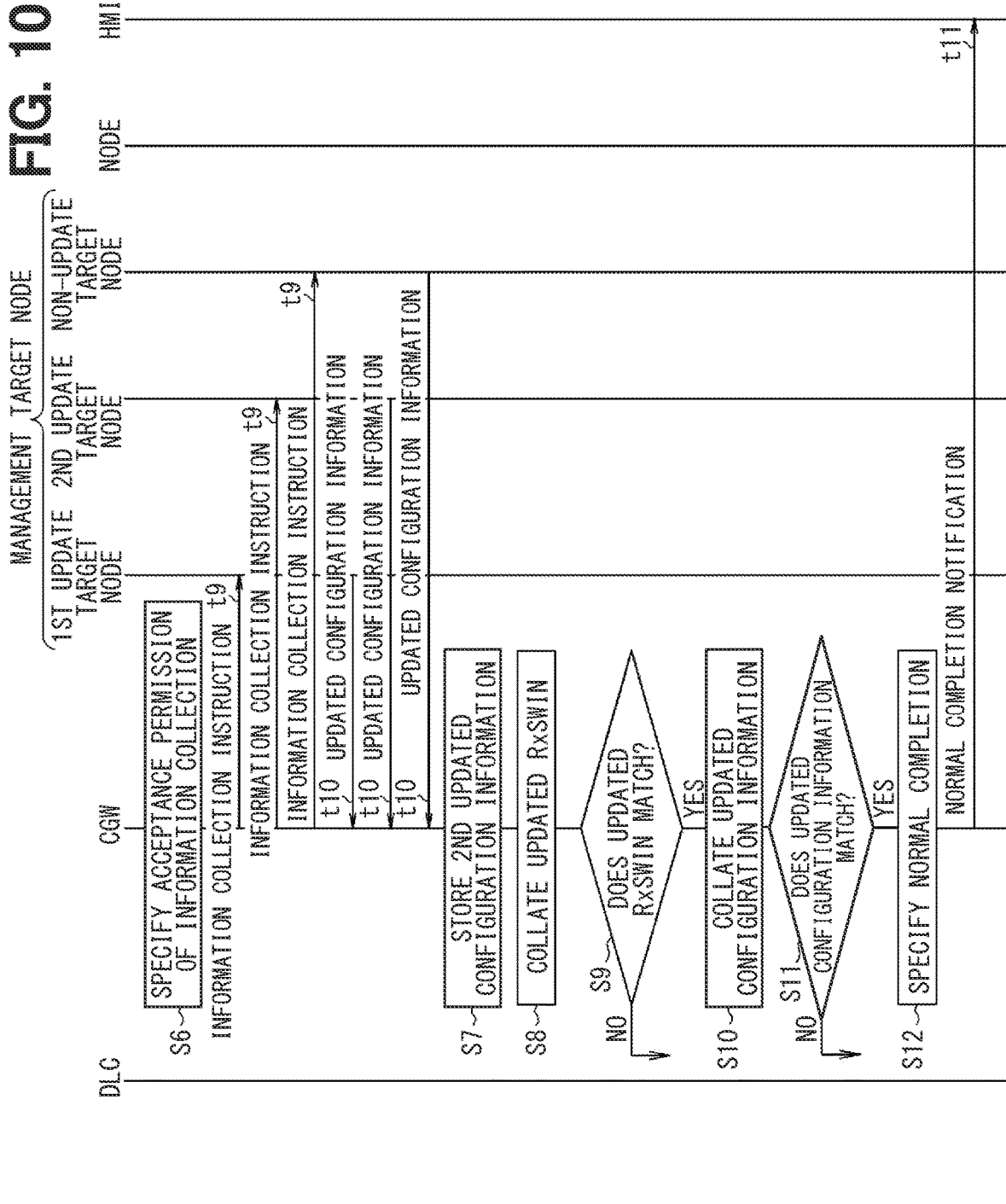
FIG. 10 is a diagram illustrating a flow of processing.
Figure 11:
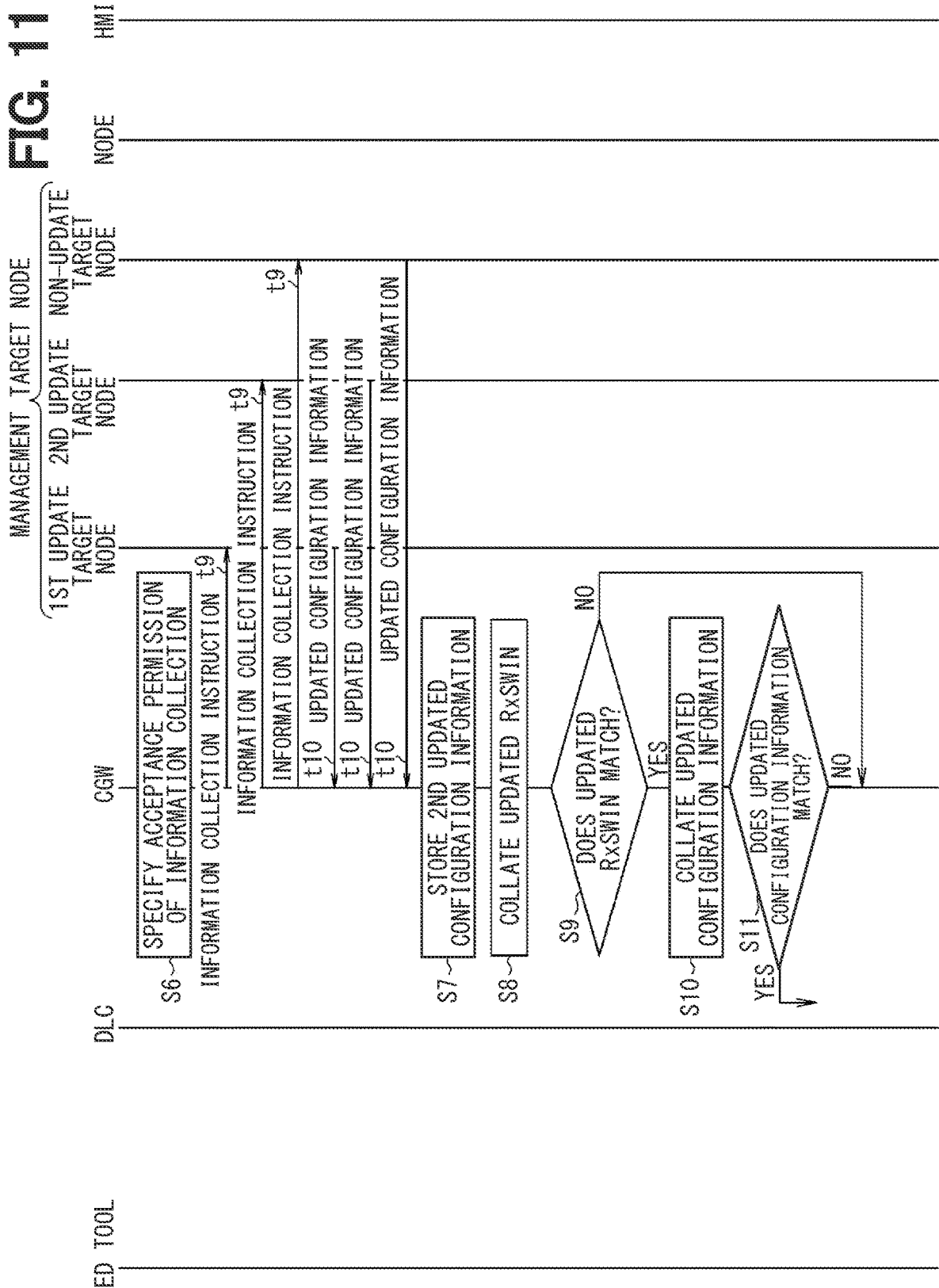
FIG. 11 is a diagram illustrating a flow of processing.
Figure 12:
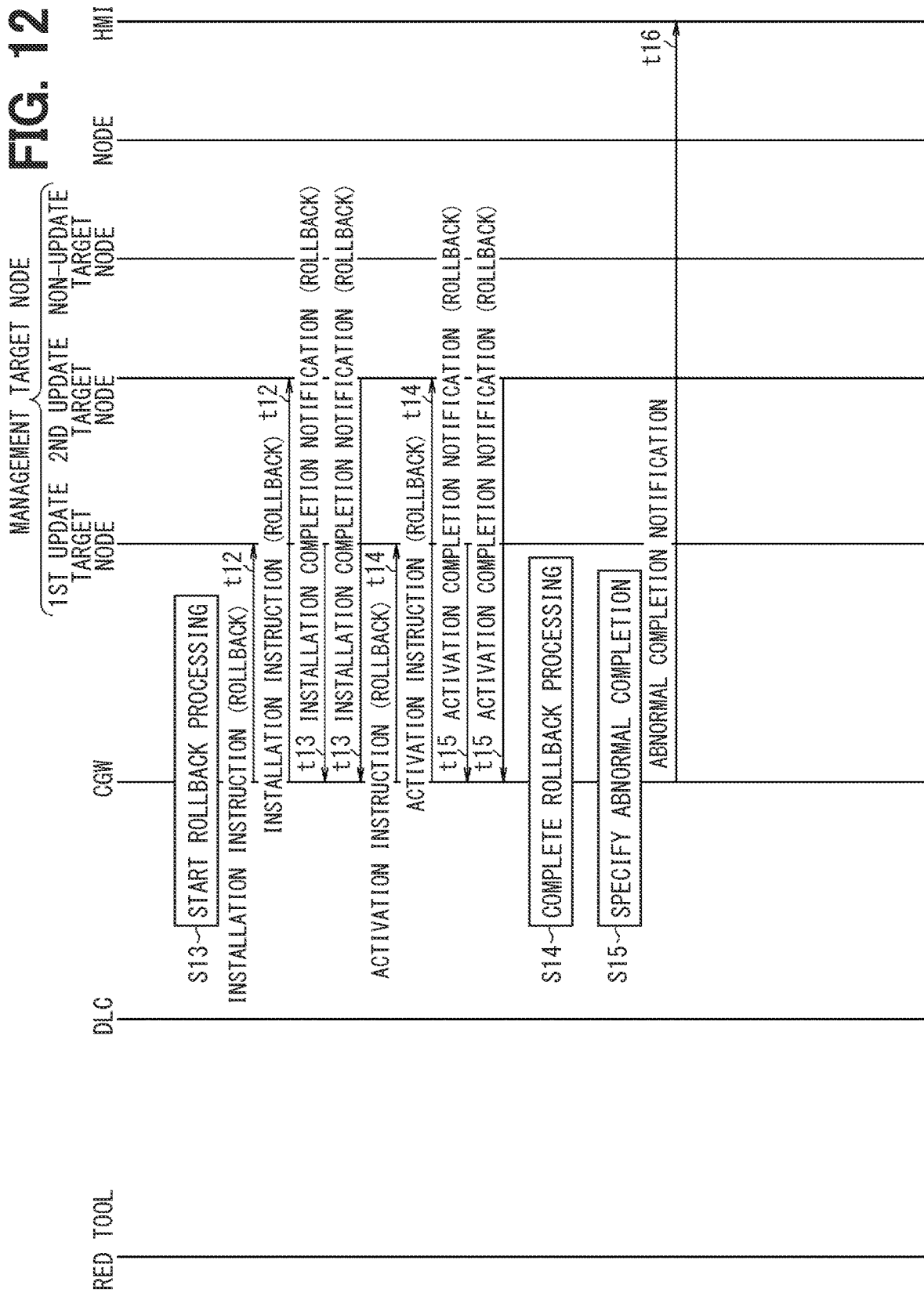
FIG. 12 is a diagram illustrating a flow of processing.
Figure 13:
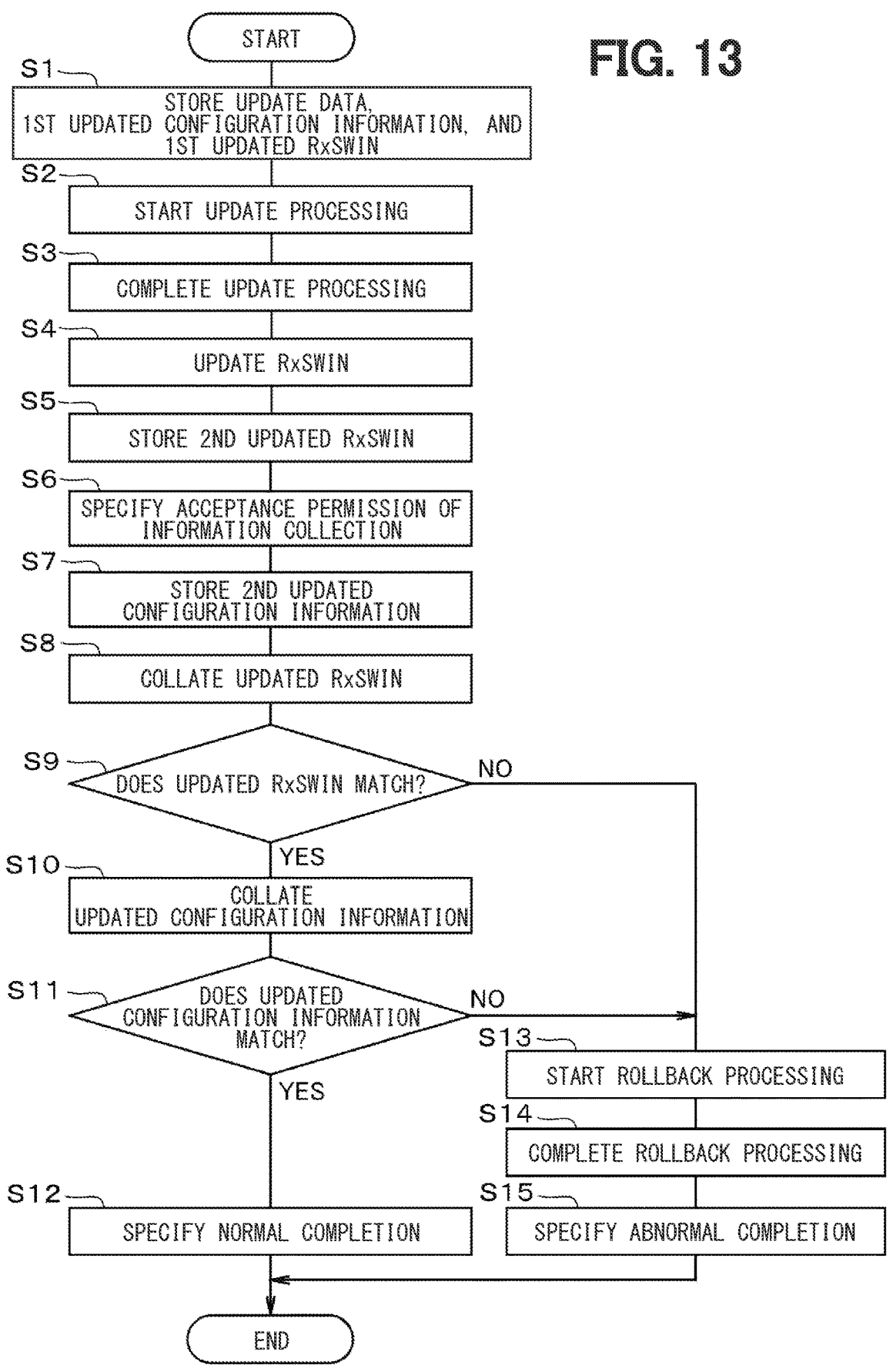
FIG. 13 is a flowchart.

As illustrated in FIG. 8, the RxSWIN holding unit 34g holds the RxSWIN, and updates the RxSWIN held by the RxSWIN holding unit 34g before and after the update of the software when the update of the software is the target of a legal request. For example, the RxSWIN held by the RxSWIN holding unit 34g is updated to RxSWIN acquired by the first updated RxSWIN acquisition unit 34f after the activation is completed. On the other hand, the RxSWIN holding unit 34g does not update the RxSWIN held by the RxSWIN holding unit 34g before and after the update of the software when the update of the software is not the target of a legal request. FIG. 8 illustrates a case where the RxSWIN is updated from "01234" to "012345" in a case where the update of the software is the target of a legal request.

The second updated RxSWIN acquisition unit 34h acquires RxSWIN obtained by updating the RxSWIN held by the RxSWIN holding unit 34g as the second updated RxSWIN. That is, when the update of the software is the target of a legal request, the second updated RxSWIN acquisition unit 34h acquires the second updated RxSWIN since the RxSWIN is updated before and after the update of the software. When the update of the software is not the target of a legal request, the second updated RxSWIN acquisition unit 34*h* does not acquire the second updated RxSWIN since the RxSWIN is not updated before and after the update of the software.

The second consistency determination unit 34*i* collates the first updated RxSWIN with the second updated RxSWIN to determine whether the first updated RxSWIN and the second updated RxSWIN match each other, and determines the consistency of the updated RxSWIN. In this case, when the update of the software is the target of a legal request and the update of the software is normally completed, the first updated RxSWIN and the second updated RxSWIN match, and when the update of the software is not normally completed, the first updated RxSWIN and the second updated RxSWIN do not match. When determining that the first updated RxSWIN and the second updated RxSWIN match, the second consistency determination unit 34*i* determines the consistency of the updated RxSWIN, that is, that the updated RxSWIN is consistent. On the other hand, when determining that the first updated RxSWIN does not match the second updated RxSWIN, the second consistency determination unit 34*i* determines the non-consistency of the updated RxSWIN, that is, that the updated RxSWIN is not consistent.

In a case where the update of the software is the target of a legal request, when it is determined that at least any one of the updated RxSWIN or the updated configuration information is not consistent, and it is determined that the update of the software is abnormally completed, the rollback execution unit 34*j* performs rollback of returning the software of the update target ECU 19 to a state before the update. In a case where the update of the software is not the target of a legal request, when it is determined that the updated configuration information is not consistent, and it is determined that the update of the software is abnormally completed, the rollback execution unit 34*j* performs rollback of returning the software of the update target ECU 19 to a state before the update. In this case, the rollback execution unit 34*j* executes rollback according to the memory configuration of a non-volatile memory installed in the update target ECU 19.

In a case where the update of the software is the target of a legal request, when it is determined that both the updated RxSWIN and the updated configuration information are consistent and it is determined that the update of the software is normally completed, the display control unit 34*k* transmits a normal completion notification to the in-vehicle display 7 and causes the in-vehicle display 7 to display that the update of the software is normally completed. In a case where the update of the software is not the target of a legal request, when it is determined that the updated configuration information is consistent and it is determined that the update of the software is normally completed, the display control unit 34*k* transmits a normal completion notification to the in-vehicle display 7 and causes the in-vehicle display 7 to display that the update of the software is normally completed.

In a case where the update of the software is the target of a legal request, when it is determined that at least any one of the updated RxSWIN or the updated configuration information is not consistent and it is determined that the update of the software is abnormally completed, the display control unit 34*k* transmits an abnormal completion notification to the in-vehicle display 7 and causes the in-vehicle display 7 to display that the update of the software is abnormally completed. In a case where the update of the software is not the target of a legal request, when it is determined that the updated configuration information is not consistent and it is determined that the update of the software is abnormally completed, the display control unit 34*k* transmits an abnormal completion notification to the in-vehicle display 7 and causes the in-vehicle display 7 to display that the update of the software is abnormally completed.

Next, the operation of the above-described configuration will be described with reference to FIGS. 9 to 13. Here, it is assumed that the update of the software is the target of a legal request, and the update data, the updated configuration information, and the updated RxSWIN are transferred from the storage 24 to the wired tool 23 and stored.

When the operator performs a transfer operation using the wired tool 23, the wired tool 23 transfers the update data, the updated configuration information, and the updated RxSWIN to the CGW 13 via a DLC 22 (t1). In the CGW 13, when the update data, the updated configuration information, and the updated RxSWIN are transferred from the wired tool 23 via the DLC 22, the control unit 34 stores the transferred update data, stores the updated configuration information as the first updated configuration information, and stores the updated RxSWIN as the first updated RxSWIN (S1, corresponding to an update data acquisition step, a first updated configuration information acquisition step, and a first updated system software identification information acquisition step).

When the operator performs a software update operation using the wired tool 23, the wired tool 23 transfers an update execution instruction to the CGW 13 via the DLC 22 (t2). When the update execution instruction is transferred from the wired tool 23 via the DLC 22, the control unit 34 starts update processing (S2, corresponding to a software update step). That is, the control unit 34 transmits the update data to the update target ECU 19 and transmits an installation instruction to the update target ECU 19 in a case where a condition under which installation can be instructed is satisfied (t3). When the installation instruction is received from the CGW 13, the update target ECU 19 executes the installation of the update data in a case where a condition under which the installation can be executed is satisfied. When the installation of the update data is completed, the update target ECU 19 transmits an installation completion notification to the CGW 13 (t4).

When the installation completion notification is received from the update target ECU 19, the control unit 34 specifies the installation completion of the update data in the update target ECU 19, and transmits an activation instruction to the update target ECU 19 in a case where a condition under which activation to activate software after the update completion can be instructed is satisfied (t5). When the activation instruction is received from the CGW 13, the update target ECU 19 executes the activation in a case where a condition under which the activation can be executed is satisfied. When the activation is completed, the update target ECU 19 transmits an activation completion notification to the CGW 13 (t6). At this time, the update target ECU 19 updates the configuration information by performing the update processing.

When the activation completion notification is received from the update target ECU 19, the control unit 34 completes the update processing (S3), updates the RxSWIN held by the control unit 34 (S4), and stores the updated RxSWIN as the second updated RxSWIN (S5, corresponding to a second updated system software identification information acquisition step).

The control unit 34 transmits an acceptance display instruction to the in-vehicle display 7 as an HMI (t7). When receiving the acceptance display instruction from the CGW 13, the in-vehicle display 7 displays an information collection acceptance screen. The information collection acceptance screen is a screen on which the operator can select whether to accept the collection of the updated configuration information. When the operator performs the operation of permitting the acceptance on the in-vehicle display 7, the in-vehicle display 7 transmits the acceptance permission to the CGW 13 (t8).

when the acceptance permission is received from the in-vehicle display 7, the control unit 34 specifies the acceptance permission for information collection (S6) and transmits an information collection instruction to the management target ECU 19 (t9). When the information collection instruction is received from the CGW 13, the management target ECU 19 reads the updated configuration information, and transmits the read updated configuration information to the CGW 13 (t10).

When the updated configuration information is received from the management target ECU 19, the control unit 34 stores the received updated configuration information as the second updated configuration information (S7, corresponding to a second updated configuration information acquisition step).

The control unit 34 collates the first updated RxSWIN with the second updated RxSWIN (S8), and determines whether the first updated RxSWIN and the second updated RxSWIN match each other (S9, corresponding to a second consistency determination step). When it is determined that the first updated RxSWIN and the second updated RxSWIN match each other, and it is determined that the updated RxSWIN is consistent (S9: YES), the control unit 34 collates the first updated configuration information with the second updated configuration information (S10), and determines whether the first updated RxSWIN and the second updated RxSWIN match each other (S11, corresponding to a first consistency determination step). When it is determined that the first updated RxSWIN and the second updated RxSWIN match each other, and it is determined that the updated configuration information is consistent (S11: YES), the control unit 34 specifies normal completion of the software update (S12), and transmits a normal completion notification to the in-vehicle display 7 (t11). When receiving the normal completion notification from the CGW 13, the in-vehicle display 7 displays that the update of the software is normally completed.

Specifically, ECU_A, ECU_B, and ECU_C illustrated in FIG. 5 respectively correspond to a first update target node, a second update target node, and a non-update target node, which are illustrated in FIGS. 9 to 12. When it is determined that the RxSWIN included in the updated configuration information of the software illustrated in FIG. 5 matches the updated RxSWIN of the software illustrated in FIG. 7 and it is determined that the updated configuration information of the software illustrated in FIG. 5 matches the updated configuration information of the software illustrated in FIG. 8, the control unit 34 specifies normal completion of the update of the software.

On the other hand, when it is determined that the first updated RxSWIN and the second updated RxSWIN do not match and it is determined that the updated RxSWIN is not consistent (S9: NO), or when it is determined that the updated RxSWIN is consistent but it is determined that the first updated configuration information and the second updated configuration information do not match and it is determined that the updated configuration information is not consistent (S11: NO), the control unit 34 starts rollback processing of returning the software of the update target ECU 19 to a state before the update (S13). That is, the control unit 34 transmits rollback data to the update target ECU 19 and transmits the installation instruction to the update target ECU 19 (t14). When the installation instruction is received from the CGW 13, the update target ECU 19 executes the installation of the rollback data in a case where a condition under which the installation can be executed is satisfied. When the installation of the rollback data is completed, the update target ECU 19 transmits an installation completion notification to the CGW 13 (t13).

When the installation completion notification is received from the update target ECU 19, the control unit 34 specifies the installation completion of the rollback data in the update target ECU 19, and transmits an activation instruction to the update target ECU 19 in a case where a condition under which activation to activate software after the update completion can be instructed is satisfied (t14). When the activation instruction is received from the CGW 13, the update target ECU 19 executes the activation in a case where a condition under which the activation can be executed is satisfied. When the activation is completed, the update target ECU 19 transmits an activation completion notification to the CGW 13 (t15).

When the activation completion notification is received from the update target ECU 19, the control unit 34 completes the rollback processing (S14), specifies abnormal completion of the software update (S15), and transmits the abnormal completion notification to the in-vehicle display 7 (t16). When receiving the abnormal completion notification from the CGW 13, the in-vehicle display 7 displays that the update of the software is abnormally completed.

Although the case where the update of the software is the target of a legal request has been described above in the control unit 34, in a case where the update of the software is not the target of a legal request or in a case where the updated RxSWIN is not transferred from the wired tool 23 to the CGW 13 via the DLC 22, S4, S5, S8, and S9 described above are omitted, the RxSWIN held by the control unit 34 is not updated, and the RxSWIN is not collated.

Although the configuration in which the control unit 34 transmits the acceptance display instruction to the in-vehicle display 7 has been described, the acceptance display instruction may be transmitted to the wired tool 23, or the acceptance permission may be received from the wired tool 23 when the operator performs an operation of permitting the acceptance by using the wired tool 23. The control unit 34 may transmit the acceptance display instruction to both the in-vehicle display 7 and the wired tool 23 such that the operator can perform an operation to permit the acceptance with either the in-vehicle display 7 or the wired tool 23. The operator may select the transmission destination of the acceptance display instruction.

Although the configuration in which the control unit 34 transmits the normal completion notification and the abnormality completion notification to the in-vehicle display 7 has been described, the normal completion notification and the abnormality completion notification may be transmitted to the wired tool 23, or the normal completion notification and the abnormality completion notification may be transmitted to both the in-vehicle display 7 and the wired tool 23. The operator may select the transmission destination of the normal completion notification or the abnormal completion notification.

The case where the control unit 34 first collates the first updated RxSWIN with the second updated RxSWIN and collates the first updated configuration information with the second updated configuration information in a case where the updated RxSWIN is consistent has been described.

However, the control unit 34 may first collate the first updated configuration information with the second updated configuration information and collate the first updated RxSWIN with the second updated RxSWIN in a case where the updated configuration information is consistent.

The case where the wired tool 23 simultaneously transfers the update data, the updated configuration information, and the updated RxSWIN to the CGW 13 has been described, but a timing of transferring the update data to the CGW 13 may be different from a timing of transferring the updated configuration information and the updated RxSWIN to the CGW 13. Although the aspect in which the updated RxSWIN is included as one of the components of the updated configuration information transferred to the CGW 13 has been described, the updated RxSWIN may be different from the updated configuration information, and a timing of transferring the updated RxSWIN to the CGW 13 may be different from a timing of transferring the updated configuration information to the CGW 13.

As described above, according to the present embodiment, the following operational effects can be obtained.

In the CGW 13, the consistency of the updated configuration information is determined by collating the first updated configuration information acquired from the wired tool 23 with the second updated configuration information acquired from the management target ECU 19 including the update target ECU 19 after the software of the update target ECU 19 is updated. It is possible to appropriately verify whether the updated configuration information is proper even when the contract of the OTA service is not made and the communication connection with the center device cannot be established, and it is possible to appropriately ensure safety and security.

In CGW 13, the consistency of the updated RxSWIN is determined by collating the first updated RxSWIN acquired from the wired tool 23 with the second updated RxSWIN obtained by updating the RxSWIN held in the CGW 13 after the update of the software. In a case where the update of the software is the target of a legal request, safety and security can be more appropriately ensured.

In the CGW 13, when it is determined that the updated RxSWIN is not consistent, or it is determined that the updated RxSWIN is consistent but the updated configuration information is not consistent, the rollback is performed. By performing the rollback, the software of the update target node can be returned to the state before the update.

Although the present disclosure has been described in accordance with examples, it is understood that the present disclosure is not limited to the examples and configurations. The present disclosure also includes various modifications and the modifications within an equivalent range. Various combinations and modes, and other combinations and modes including only one element, more elements, or less elements are also within the scope and idea of the present disclosure.

When the update data, the updated configuration information, and the updated RxSWIN are transferred from the wired tool 23 via the DLC 22, the control unit 34 may determine whether the contract of the OTA service is made, or may determine whether it is possible to establish a communication connection with the center device 3. That is, the control unit 34 may perform step S1 and the subsequent steps in a case where it is determined that the contract of the OTA service is not made and it is determined that the communication connection with the center device 3 cannot be established. The control unit 34 may perform step S1 and the subsequent steps in a case where it is determined that the contract of the OTA service is made but it is determined that the communication connection with the center device 3 cannot be established.

In a case where the contract of the OTA service is made, and then the communication connection with center device 3 can be established, the collation of the updated configuration information and the collation of the updated RxSWIN may be performed by both the center device 3 and the CGW 13. For example, the collations may be performed according to the situation, for example, the collation of the updated configuration information and the collation of the updated RxSWIN may be performed by the center device 3 in a normal state in which the communication connection with the center device 3 can be established, and the collation of the updated configuration information and the collation of the updated RxSWIN may be performed by the CGW 13 in an emergency in which the communication connection with the center device 3 cannot be established.

The control units and patterns thereof described in the present disclosure may be realized by a dedicated computer provided by configuring a processor and memory programmed to execute one or more functions embodied by the computer program. Alternatively, the control units and the patterns thereof described in the present disclosure may be realized by a dedicated computer provided by configuring the processor with one or more dedicated hardware logic circuits. Alternatively, the control units and the patterns described in the present disclosure may be realized by one or more dedicated computer including a combination of a processor and a memory programmed to execute one or more functions and a processor including one or more hardware logic circuits. The computer program may also be stored on a computer readable and non-transitory tangible storage medium as instructions executed by a computer.

What is claimed is:

1. A vehicular electronic control device comprising
at least one of (i) a circuit and (ii) a processor with a memory storing computer program code executable by the processor configured to serve as:
an update data acquisition unit that is configured to acquire update data from a wired tool operable by an operator via wired communication under a situation where contract of an over-the-air service is not made and a communication connection with a center device providing the over-the-air service is unable to be established;
a first updated configuration information acquisition unit that is configured to acquire, as first updated configuration information, updated configuration information from the wired tool by the wired communication under the situation where the communication connection with the center device is unable to be established;
a software update unit that is configured to update software of an update target node by writing the update data to the update target node;
a second updated configuration information acquisition unit that is configured to acquire, as second updated configuration information, updated configuration information from a management target node including the update target node;
a first consistency determination unit that is configured to collate the first updated configuration information with the second updated configuration information to determine consistency of the updated configuration information;
a first updated system software identification information acquisition unit that is configured to acquire, as first updated system software identification information, updated system software identification information from the wired tool by wired communication;

a system software identification information holding unit that is configured to hold system software identification information;

a second updated system software identification information acquisition unit that is configured to acquire, as second updated system software identification information, system software identification information obtained by updating the system software identification information held by the system software identification information holding unit after the update of the software; and a second consistency determination unit that is configured to collate the first updated system software identification information with the second updated system software identification information to determine consistency of the updated system software identification information.

2. The vehicular electronic control device according to claim 1, wherein the configuration information includes identification information of the management target node, hardware version information of the management target node, and software version information of the management target node.

3. The vehicular electronic control device according to claim 1, wherein the system software identification information is represented as RxSWIN.

4. The vehicular electronic control device according to claim 1, further comprising a rollback execution unit that is configured to perform rollback of returning the software of the update target node to a state before the update in a case where the first consistency determination unit determines that the updated configuration information is not consistent.

5. The vehicular electronic control device according to claim 1, further comprising a rollback execution unit that is configured to perform rollback of returning the software of the update target node to a state before the update in a case where the first consistency determination unit determines that the updated configuration information is not consistent or in a case where the second consistency determination unit determines that the updated system software identification information is not consistent.

6. The vehicular electronic control device according to claim 1, further comprising a display control unit that is configured to cause at least any one of a display terminal or the wired tool to display a determination result of the first consistency determination unit.

7. The vehicular electronic control device according to claim 1, further comprising a display control unit that is configured to cause at least any one of a display terminal or the wired tool to display at least any one of a determination result of the first consistency determination unit or a determination result of the second consistency determination unit.

8. A vehicular electronic control system comprising:

a wired tool that is operable by an operator; and a vehicular electronic control device that is communicable to the wired tool via a wire, wherein the vehicular electronic control device includes at least one of (i) a circuit and (ii) a processor with a memory storing computer program code executable by the processor configured to serve as an update data acquisition unit that acquires update data from the wired tool by wired communication under a situation where contract of an over-the-air service is not made and a communication connection with a center device providing the over-the-air service is unable to be established, a first updated configuration information acquisition unit that acquires, as first updated configuration information, updated configuration information from the wired tool by the wired communication under the situation where the communication connection with the center device is unable to be established, a software update unit that updates software of an update target node by writing the update data to the update target node, a second updated configuration information acquisition unit that acquires, as second updated configuration information, updated configuration information from a management target node including the update target node, a first consistency determination unit that collates the first updated configuration information with the second updated configuration information to determine consistency of the updated configuration information, a first updated system software identification information acquisition unit that acquires, as first updated system software identification information, updated system software identification information from the wired tool by the wired communication, a system software identification information holding unit that holds system software identification information, a second updated system software identification information acquisition unit that acquires, as second updated system software identification information, system software identification information obtained by updating the system software identification information held by the system software identification information holding unit after the update of the software, and a second consistency determination unit that collates the first updated system software identification information with the second updated system software identification information to determine consistency of the updated system software identification information.

9. A non-transitory computer readable storage medium storing an updated configuration information determination program for causing a control unit of a vehicular electronic control device, including at least one of (i) a circuit and (ii) a processor with a memory storing computer program code executable by the processor, to execute:

an update data acquisition step of acquiring update data from a wired tool operable by an operator via wired communication under a situation where contract of an over-the-air service is not made and a communication connection with a center device providing the over-the-air service is unable to be established;

a first updated configuration information acquisition step of acquiring, as first updated configuration information, updated configuration information from the wired tool by the wired communication under the situation where the communication connection with the center device is unable to be established;

a software update step of updating software of an update target node by writing the update data to the update target node;

a second updated configuration information acquisition step of acquiring, as second updated configuration information, updated configuration information from a management target node including the update target node;

a first consistency determination step of collating the first updated configuration information with the second updated configuration information to determine consistency of the updated configuration information;

a first updated system software identification information acquisition step of acquiring, as first updated system software identification information, updated system software identification information from the wired tool by the wired communication;

a second updated system software identification information acquisition step of acquiring, as second updated system software identification information, system software identification information obtained by updating the held system software identification information after the update of the software; and a second consistency determination step of collating the first updated system software identification information with the second updated system software identification information to determine consistency of the updated system software identification information.

* * * * *